March 6, 1945.    G. ELWERT    2,371,036
SHEET METAL STRUCTURE
Filed June 24, 1943
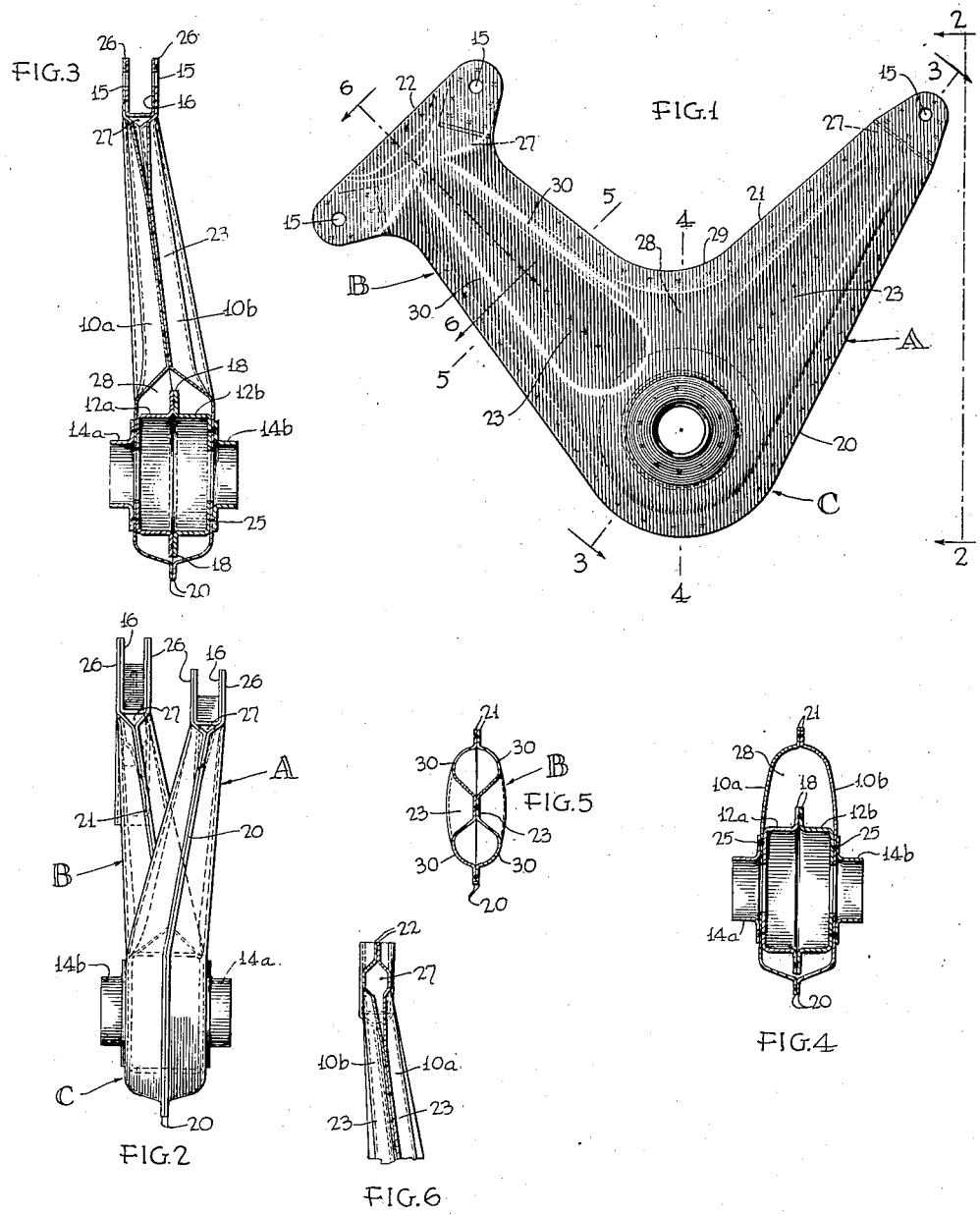
INVENTOR
George Elwert.
BY John P. Tarbox
ATTORNEY Patented Mar. 6, 1945

2,371,036

UNITED STATES PATENT OFFICE 2,371,036

SHEET METAL STRUCTURE

George Elwert, Conshohocken, Pa., assignor to Edward G. Budd Manufacturing Company, Philadelphia, Pa., a corporation of Pennsylvania Application June 24, 1943, Serial No. 492,089

11 Claims. (Cl. 74—519)

This invention relates to a sheet metal structure, particularly to a power transmitting structure, such as a bell crank, which has great strength and rigidity for its weight, and has for an object the provision of improvements in this art. Such a device finds especial usefulness in aircraft constructions where maximum strength and minimum weight are always of prime importance. The structure which is specifically illustrated herein is a bell crank for operating the wing flap of an airplane.

In addition to the above-mentioned object of providing maximum strength for a minimum of weight, the invention has for an object the manufacture of a sheet metal article of a particular shape by electrical spot welding procedure; and this at minimum expense for labor and material.

The bell crank is intended to mount a roller bearing assembly inside its hub, hence another object is to provide a simple, strong, and convenient hub anchorage for the bearing assembly.

The enumerated and other objects of the invention will be apparent from the following description of an exemplary embodiment of the invention, reference being made to the accompanying drawing thereof, wherein:

Fig. 1 is a flat side elevation of a flap-operating bell crank embodying the invention;

Fig. 2 is an edge side elevation of the same, the view being taken on the line 2—2 of Fig. 1;

Fig. 3 is a longitudinal cross section through one arm, taken on the line 3—3 of Fig. 1;

Fig. 4 is a cross section through the crotch, taken on the line 4—4 of Fig. 1;

Fig. 5 is a transverse cross section through the other arm, the view being taken on the line 5—5 of Figs. 1 and 6; and Fig. 6 is a partial longitudinal cross section through the outer end of the second arm, the view being taken on the line 6—6 of Fig. 1.

Referring to the drawing, the bell crank comprises a first arm A (the right, Fig. 1), a second arm B (the left, Fig. 1), and a hub C connecting the arms. A roller bearing assembly (not shown) is secured in the hub bore in any suitable manner.

The main part of the bell crank structure is formed by two pairs of mating half-shell stampings. The first pair 10a, 10b forms the arms and the hub enclosure and the second pair 12a, 12b forms the inner hub. A third pair of companion stampings 14a, 14b forms the noses of the hub. At the outer ends, where the arms are provided with link-connection pin holes 15, they are strengthened by U-shaped stampings 16. In Fig. 2 it will be noted that the arms are inclined in opposite directions from a central plane which is perpendicular to the hub bore axis.

The hub stampings 12a, 12b are provided with protruding peripheral flanges 18 which are placed in juxtaposition and welded together, as by suitable welding tongs from the outside.

The arm stampings 10a, 10b are provided with protruding outer flanges 20 and 21 which are placed in juxtaposition and welded together as by suitable welding tongs from the outside. The arm B which has the two connection pin holes is provided with the exterior end flanges 22 which are pinched together in juxtaposition and welded together as by suitable welding tongs from the outside. Between the region of the hub and extending to a point near the outer ends the arms A and B are formed with fluted depressions 23 which are placed in juxtaposition and welded together as by suitable welding tongs from the outside.

Before the arm stampings 10a, 10b are brought together for welding, the hub member, formed by welding the half-shells 12a, 12b together, is placed between them. The hub member elements 12a, 12b, the arm elements 10a, 10b, and the nose elements 14a, 14b are welded together through their juxtaposed walls, as at 25. One arm of the straddling welding tongs is suitably formed to enter the hub bore in welding these parts together. The inner diameter of the bearing receiving nose elements 14a, 14b, as shown in Figs. 3 and 4, is smaller than the inner diameter of the openings in the side walls of the parts 10a, 10b, 12a, 12b, whereby shoulders are provided for limiting the inner position of the bearings.

The U-shaped reinforcing stampings 16 are placed between the spaced flanges 26 of the arms and welded in place. It will be noted from Figs. 2, 3, and 6 that through-openings 27 are left between the sides of the arms beneath the U-shaped members 16.

As shown in Figs. 3 and 4, an open space 28 is left around the hub member, including the section at the crotch 29, Figs. 1 and 4.

The external flanges 20, 21 and the interior fluted depressions 23 of the arms leave longitudinal strengthening ridges 30, as shown in Fig. 5.

Although the arms A and B are bent away from the intermediate trans-axial plane, the outer ends are bent back into parallel trans-axial planes thus placing the connection pin holes 15 parallel to the hub axis.

While the hub is strengthened by the hub member composed of the parts 12a, 12b, and the hub nosings 14a, 14b are here employed, it is possible in lighter service to dispense with either or both of these parts, the arm assembly having utility alone or with a bearing assembly. The hub portion of the arm assembly may, if desired, be reinforced by flat hub plates welded thereto before or after the parts are welded together.

The described structure has great strength but is very light even when made of such material as cold-rolled stainless steel sheet. It can be made and assembled with economy and speed. It is to be noted that the hub member may be formed as a separate sub-assembly thus dividing and simplifying plant operations.

While one embodiment of the invention has been described for purposes of illustration, it is to be understood that the invention may have various embodiments within the limits of the prior art and the scope of the subjoined claims.

What is claimed is:

1. A sheet metal structure comprising a pair of hub stampings having outer flanges which are secured together and spaced sides extending inwardly to openings, and a pair of outer stampings each including a hub with a central opening and a radial portion, said outer stampings having edge flanges which are secured together and sides which lie alongside and are secured to the sides of the hub stampings, the side walls being accessible through the openings.

2. A sheet metal structure comprising a pair of hub stampings having peripheral flanges which are secured together and inwardly extending spaced sides with a hub opening, a pair of outer stampings including a hub and angularly spaced radial arms, said outer stampings having edge flanges which are secured together and sides with a hub opening which lie alongside the sides of the hub stampings, and a pair of hub nose stampings with sides with a hub opening which lie along the other sides, all of said sides being secured together around the hub opening.

3. A sheet metal structure comprising in combination a pair of mating annular externally flanged hub stampings welded together through the external flanges, said hub stampings having generally parallel inwardly extending side walls with hub openings, a pair of mating annular externally flanged outer stampings welded together through the external flanges, said outer stampings having a hub cavity surrounding the joined hub stampings and generally parallel sides with hub openings which lie alongside the generally parallel sides of the hub stampings, and a pair of hub nose stampings including a tube and radial flanges which lie alongside the sides of the hub and outer stampings and are welded thereto, said outer stampings also including radial arms having fluted medial depressions along their length which are juxtaposed and welded together.

4. A sheet metal structure comprising in combination a pair of mating annular externally flanged hub stampings welded together through the external flanges, said hub stampings having generally parallel inwardly-extending side walls with hub openings, a pair of mating annular externally flanged outer stampings welded together through the external flanges, said outer stampings having a hub cavity surrounding the joined hub stampings and generally parallel sides with hub openings which lie alongside the generally parallel sides of the hub stampings, and a pair of hub nose stampings including a tube and radial flanges which lie alongside the sides of the hub and outer stampings and are welded thereto, said outer stampings also including radial arms having fluted medial depressions along their length which are juxtaposed and welded together, said arms having spaced flanges at the end, and U-shaped reinforcing stampings welded between said end flanges.

5. A sheet metal structure comprising in combination a pair of mating annular externally flanged hub stampings welded together through the external flanges, said hub stampings having generally parallel inwardly extending side walls with hub openings, a pair of mating annular externally flanged outer stampings welded together through the external flanges, said outer stampings having a hub cavity surrounding the joined hub stampings and generally parallel sides with hub openings which lie alongside the generally parallel sides of the hub stampings, and a pair of hub nose stampings including a tube and radial flanges which lie alongside the sides of the hub and outer stampings and are welded thereto, said outer stampings also including radial arms having fluted medial depressions along their length which are juxtaposed and welded together, said arms having spaced flanges at the end, and a U-shaped reinforcing stamping welded between said end flanges, one of said arms having U-shaped reinforcements at each edge and being pinched together and welded between the edges.

6. A sheet metal structure as set forth in claim 5, further characterized by the fact that said arms are bent in opposite directions from a medial plane normal to the hub axis, have their ends bent back into planes parallel to the medial plane, and have connecting pin holes through the U-shaped reinforcements, the axes of which are parallel to the hub axis.

7. A sheet metal structure comprising in combination, a hub member formed of two cupped exteriorly flanged half-shell elements secured together through their flanges and having inwardly extending sides with hub openings, an outer member formed of two hollow exteriorly flanged half-shell elements secured together through their flanges and having hub openings in their sides, said outer half-shell elements having a hub space which completely surrounds the flanges on said hub elements and having their sides which lie alongside the sides of the hub elements welded thereto, said outer elements having radial depressions between their spaced hub portions and spaced portions at their ends and being secured together along said depressions.

8. A sheet metal structure comprising two mating half-shell elements having axially spaced hub portions forming an annular hub cavity around a hub opening, circumferentially spaced radial arms on said elements, external flanges on said elements at the hub and extending out said arms for a distance short of the ends, radial depressions in said arms extending from beyond the spaced hub portions to approximately the outer ends of said flanges, said elements being secured together through said flanges and depressed portions.

9. A sheet metal structure comprising two mating half-shell elements having axially spaced hub portions forming an annular hub cavity around a hub opening, circumferentially spaced radial arms on said elements, external flanges on said elements at the hub and extending out said arms for a distance toward the ends, radial depressions in said arms extending from beyond the spaced hub portions to approximately the outer ends of said flanges, said elements being secured together through said flanges and depressed portions, said elements being spaced apart at the ends, and a U-shaped reinforcing element secured between said spaced ends.

10. A sheet metal structure comprising two mating half-shell elements having axially spaced hub portions forming an annular hub cavity around a hub opening, circumferentially spaced radial arms on said elements, external flanges on said elements at the hub and extending out said arms for a distance toward the ends, said elements being secured together through said flanges, said elements being spaced apart at the ends, and a U-shaped reinforcing element secured between said spaced ends.

11. A sheet metal structure comprising two mating cup-shaped interior hub members each having lateral end flanges at both ends one of which is turned inward and is provided with a hub opening, a pair of outer half-shells each having an interior side wall about a hub opening and an exterior flange, the adjacent flanges of the interior hub members being juxtaposed and secured together, the distant end flanges of the hub members each being juxtaposed and secured to an interior side wall of a half-shell, and the exterior flanges of the half-shells being juxtaposed and secured together, and a hub nose member on each side provided with lateral flanges about an axial opening, the flanges of the hub nose members being juxtaposed with the flanges of the hub members and the side walls of the half-shells and secured together with them.

GEORGE ELWERT.